April 10, 1928. 1,666,011
E. A. HOFF ET AL
WARDROBE TRUNK
Filed April 9, 1926 4 Sheets-Sheet 3
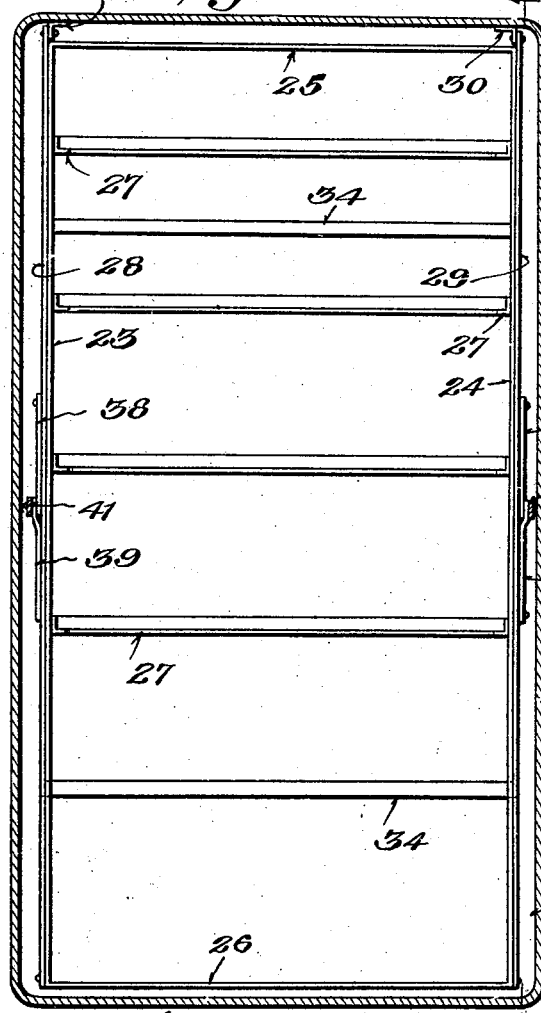
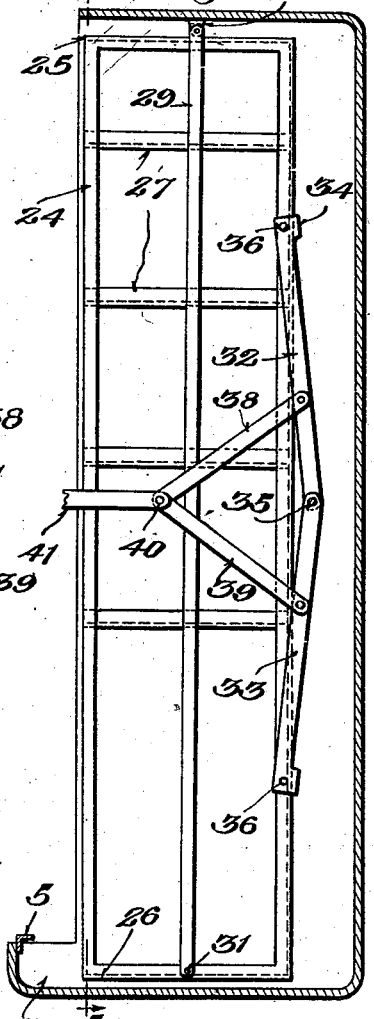
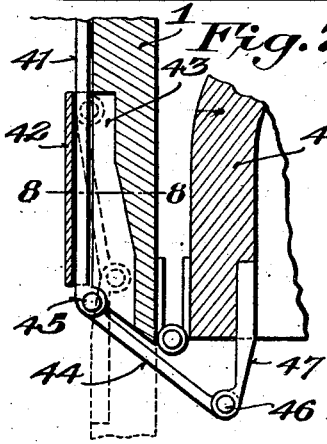
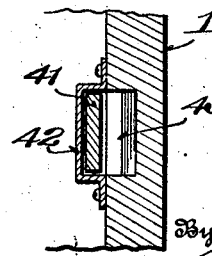
Inventors
E. A. Hoff,
W. C. Sanford, April 10, 1928.　　　　E. A. HOFF ET AL　　　1,666,011

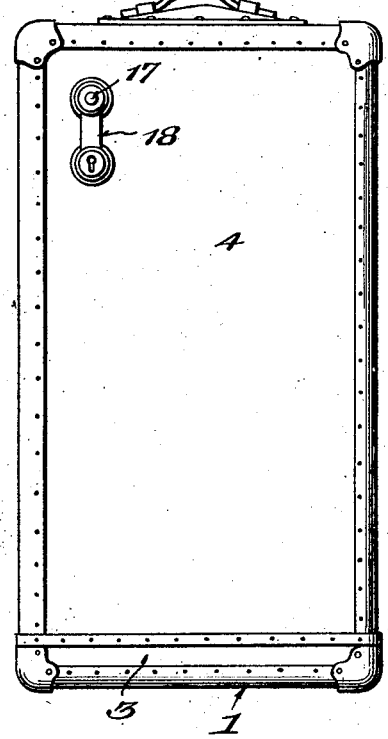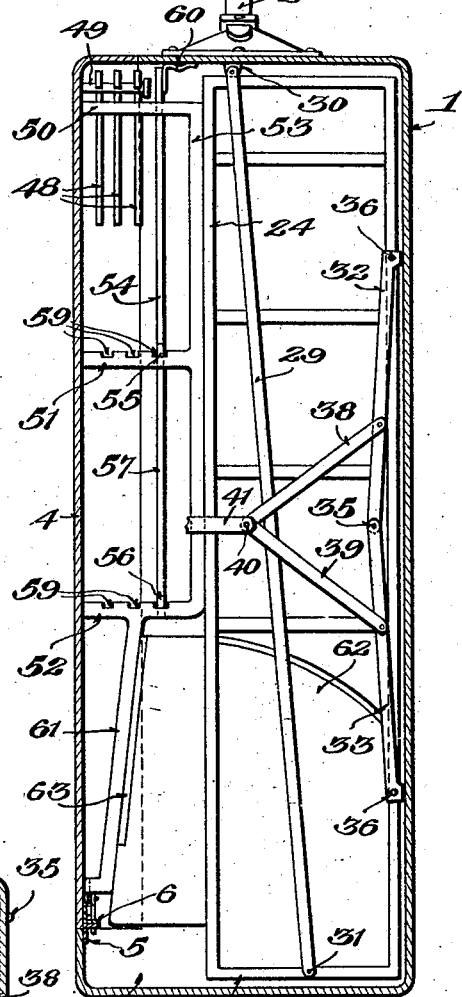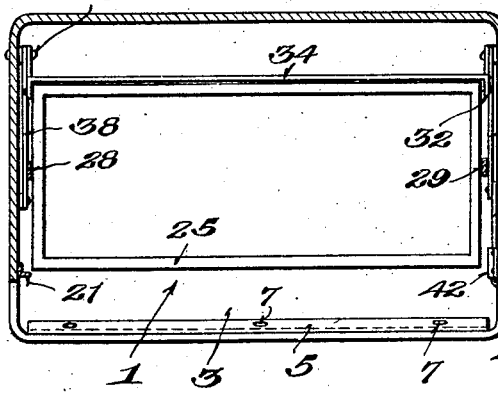

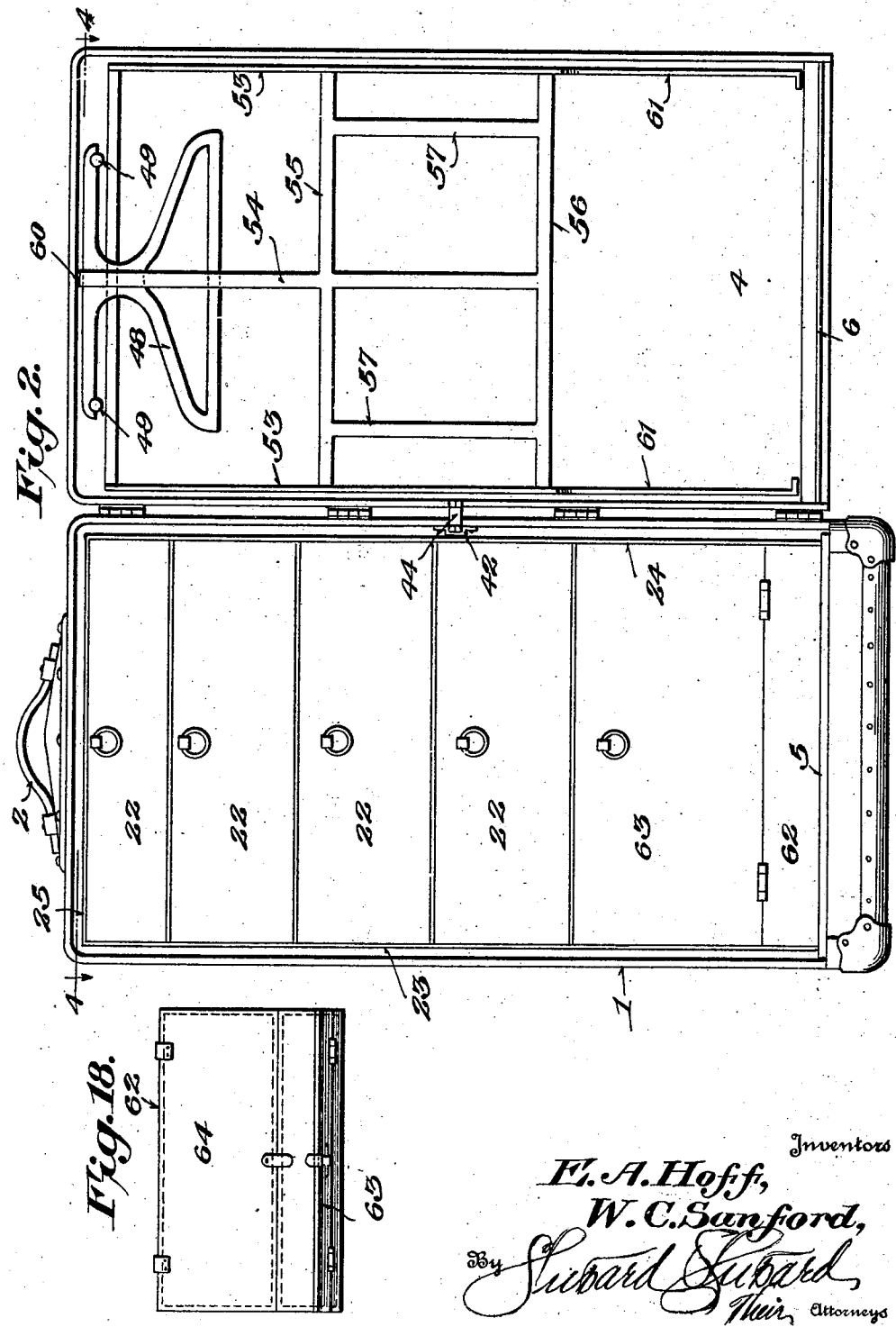

WARDROBE TRUNK

Filed April 9, 1926　　　4 Sheets-Sheet 4

Inventors
E. A. Hoff,
W. C. Sanford,
By Richard Hubard
Attorneys

Patented Apr. 10, 1928.

1,666,011

UNITED STATES PATENT OFFICE.

EDWARD A. HOFF AND WILLIAM C. SANFORD, OF LA OROYA, PERU.

WARDROBE TRUNK.

Application filed April 9, 1926. Serial No. 100,995.

This invention is a wardrobe trunk, and has for its object to provide certain new and useful improvements which will facilitate the opening and closing of the trunk, enable the convenient access to the contents of the trunk, and at all times maintain the contents of the trunk in a compact and satisfactory condition.

The trunk contains a plurality of wardrobe drawers, and it is an important object of the present invention to provide for moving them as a unit to the front of the trunk, for convenient access, by the mere opening of the front of the trunk, and also for returning the drawers as a unit into the back of the trunk body by the act of closing the front or door of the trunk.

A further object of the invention is to provide for locking the front or door of the trunk along two or more sides thereof so as to hold the front or door in a rigid closed condition throughout the edges thereof.

With these and other objects in view, the present invention consists in the combination and arrangement of parts as will be hereinafter more fully described, illustrated in the accompanying drawings and particularly pointed out in the appended claims, it of course being understood that changes in the form, proportion, size and minor details may be made, within the scope of the claims, without departing from the spirit or sacrificing any of the advantages of the invention.

In the drawings:

Figure 1 is a front elevation of a wardrobe trunk embodying the features of the present invention.

Figure 2 is a front elevation, on an enlarged scale, of a wardrobe trunk of the present invention with the front or door thereof in its open position.

Figure 3 is a central vertical sectional view of the trunk of the present invention with the door or front closed.

Figure 4 is a cross sectional view on the line 4—4 of Figure 2.

Figure 5 is a vertical sectional view on the line 5—5 of Figure 6.

Figure 6 is a vertical sectional view on the line 6—6 of Figure 5.

Figure 7 is an enlarged plan section showing the means actuated by the front or door of the trunk for moving the wardrobe drawers into and out of the body of the trunk.

Figure 8 is a detail sectional view on the line 8—8 of Figure 7.

Figure 17 is a vertical sectional view of a bin for shoes, hats and the like.

Figure 18 is a top plan view of the bin shown in Figure 17.

Figure 19 is an enlarged fragmentary view illustrating a detail of the locking mechanism.

Figure 9:
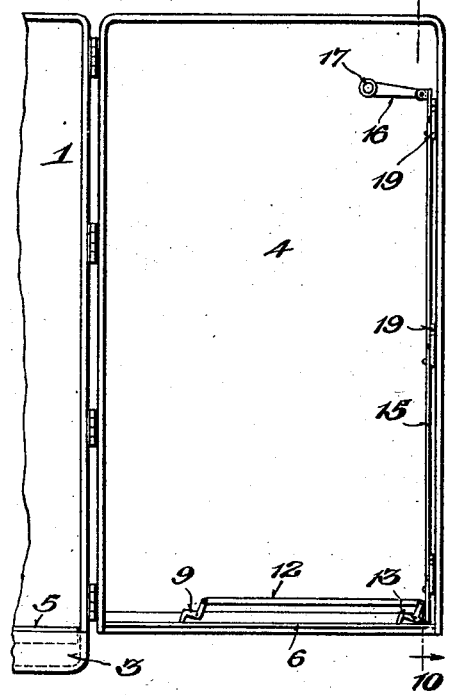
Figure 9 is a view showing the means for locking the front or door of the trunk.
Figure 10:
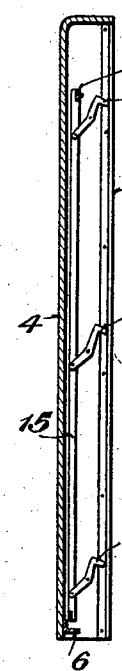
Figure 10 is a sectional view on the line 10—10 of Figure 9.
Figure 11:
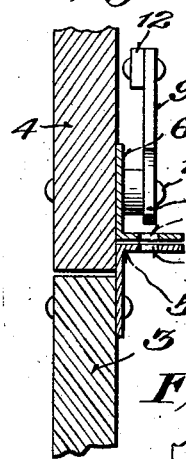
Figures 11 and 12 are enlarged detail views showing one of the locking detents.
Figure 12:
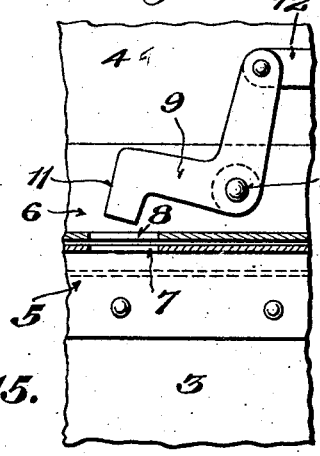
Figure 17:
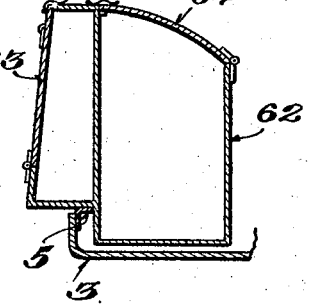

The trunk of the present invention includes a rectangular body member 1 of suitable shape and size, preferably rectangular in shape and designed to stand upon one of its small ends as a base or bottom for convenience in having access to the interior of the trunk. As shown in several of the figures in the drawings the base or bottom of the trunk body is entirely free from projections so that it may rest evenly upon the floor of a room. For convenience in handling the trunk a suitable handle 2 is provided upon the top end of the trunk. As best shown in Figure 6 of the drawings, it will be seen that the base or bottom of the trunk has an extension 3 at the open front of the trunk, and as best indicated in Figures 1 and 2 of the drawings, it will be seen that the front or door member 4 of the trunk is mounted above the extension 3 with its lower edge in close proximity to the top edge of the bottom extension 3, as clearly shown in Figure 3 of the drawings. The top of the bottom extension 3 is provided with an angle-iron 5 extending along the front thereof with the horizontal member of the angle-iron in the top thereof and extending inwardly therefrom. As best shown in Figures 3, 11 and 12, it will be seen that the front of the trunk is provided adjacent its lower edge with an angle-iron 6 having its horizontal flange at the bottom of the iron and slightly above the bottom edge of the front of the trunk and extending inwardly therefrom and overhanging the horizontal member of the angle-iron 5 on the bottom extension 3 of the trunk. The angle-iron 5 on the bottom of the trunk extends above the top edge of said bottom and constitutes a stop for the lower edge of the door 4. The horizontal members of the angles 5 and 6 are provided with registered openings 7 and 8 for the reception of a locking detent in the form of a bell crank 9 fulcrumed as at 10 upon the door and having at one end a catch member 11 designed to extend through the openings 8 and 7 in the locked condition of the door. The other arm of the locking detent is pivotally connected to a horizontal connecting rod 12 which has its opposite end pivotally connected to the upright arm of another pivotally mounted bell crank detent 13 which engages openings in the angle-irons 5 and 6 in the same manner as described for the detent 9. As best shown in Figure 19 of the drawings, it will be seen that the detent 13 is also provided with an arm 14 pivotally connected to an upright connecting rod 15 which has its upper end pivotally connected at an arm 16 carried by the rotating part 17 of the hasp lock 18 shown in Figure 1 of the drawings and on the outside of the front or door of the trunk. The upright connecting rod 15 actuates a plurality of pivotally mounted detents 19 which engage registered openings in an angle bar 20, see Figures 4 and 10, on the inner free edge of the door 4 and also in an angle bar 21, see Figure 4 of the drawings, on the inner side of the trunk body opposite the hinged edge of the door. By this locking means the front or door of the trunk is locked in a very substantial manner along its lower edge and along its upright free edge opposite its hinged edge thereof. The locking means is controlled by the hasp 18 as a crank handle when the lock has been released by the manipulation of the key in a manner as will be well understood.

Within the body of the trunk there is a series of drawers, each drawer being designated 22 in Figure 2 of the drawings, and these drawers are carried as a unit in a frame which is mounted for movement into and out of the body of the trunk. This drawer frame includes opposite duplicate rectangular frame members 23 and 24 which are connected across the top by one or more top cross bars 25 and at the bottom by one or more cross bars 26. Slideways for the drawers are provided by angle bars 27 carried by the inner sides of the frame members 23 and 24. This drawer frame is swung from the top of the trunk by the bars 28 and 29, each of which is pivoted at its upper end to a bracket 30 secured to the underside of the top of the trunk body and pivoted at its lower end to the adjacent lower end portion of the drawer frame.

Figure 14:
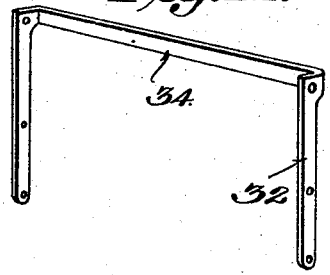
Figure 14 is a detail perspective view of one of the elements employed for moving the wardrobe drawers as a unit.
Figure 15:
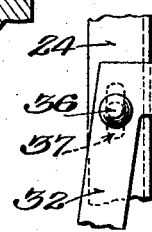
Figures 15 and 16 are enlarged views of a detail of the means connecting the set of drawers to the door for moving the drawers in and out of the trunk.
Figure 16:
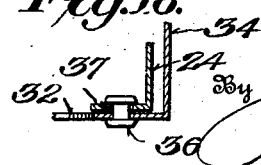

To provide for moving the drawer frame into and out of the body of the trunk, an operating connection is had between door 4 and the drawer frame so that movement of the door will impart movement to the frame. This connection includes upper and lower yokes 32 and 33, the yoke 32 being shown in perspective in Figure 14 of the drawings. These yokes are duplicates, the upper one having its cross-head portion 34 extending across the back of the drawer frame while the lower yoke 33 has its closed portion at the bottom of the yoke and extending across the back of the drawer frame. The corresponding arms of the yokes 32 and 33 are pivotally connected together upon a stationary pivot pin 35 carried by the adjacent side-wall of the trunk body, and at their outer ends are pivotally connected at 36 to the adjacent side of the drawer frame as well shown in Figure 15 of the drawings. The pivotal connection 36 is also a slidable one, the pivot member 36 being in the form of a headed stud working in a slot 37 formed in the adjacent side of the drawer frame. Upper and lower links 38 and 39 are pivotally connected to intermediate portions of the arms of the yokes 32 and 33 and have their forward ends pivotally connected at 40 to a slide bar 41 mounted upon the adjacent inner side of the body of the trunk and working through an open ended guideway 42, best shown in Figures 7 and 8 of the drawings. The body of the trunk beneath the guide member 42 is provided with an open ended recess 43 to accommodate a link 44 pivoted at 45 to the front end of the slide 41 and at its opposite end, as at 46, to a bracket 47 rigidly carried by the adjacent edge of the front or door 4 of the trunk. It will of course be understood that the operating connection between the door 4 of the trunk and the yokes 32 and 33 is at one side only of the drawer frame, as it is sufficient to apply a push or a pull to one arm only of each of the yokes 32 and 33 to effect swinging movements of the yokes 32 and 33 on their fulcrums 35 to effect movement of the drawer frame into and out of the trunk body on the swinging support afforded by the bars 28 and 29.

Within the front or door of the trunk, as best shown in Figures 2, 3 and 4 of the drawings, provision is made for the support of a plurality of clothes-hangers 48 which are supported upon headed pins or posts 49 carried by and extending forwardly from the upper portion of the door 4. When the door is open as in Figures 2 and 4, the clothes on the clothes-hangers are very conveniently accessible.

There is also provided a clothes-press to hold the clothes snugly in place against the door and prevent them from getting caught between the door and the body of the trunk when the door is being closed. This clothes-press consists of upper, intermediate and lower horizontal bars 50, 51 and 52 extending from and carried by the door, the bars at the respective edges of the door being connected by an upright 53 which presses against the drawers, in the closed position of the door, to hold the drawers and drawer frame against the back of the body of the trunk and maintain it in a rigid condition when the trunk is closed.

Figure 13:
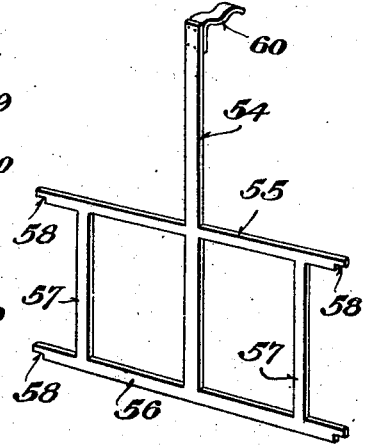
Figure 13 is a detail perspective view of the clothes-press member of the present invention.

A clothes-press member, shown in detail in Figure 13 of the drawings, includes a central upright 54, from which extend intermediate and bottom cross bars 55 and 56 that are connected adjacent their outer ends by upright bars 57. The outer end of each of the cross bars 55 and 56 is notched so as to provide a finger or projection 58 designed to fit in the seat or notches 59 provided in the top edges of the bars 51 and 52, whereby the clothes-press member may be held rigidly against the clothes hanging from the hangers 48 so as to press said clothes snugly against the body of the door 4. A suitable leaf spring 60 is provided upon the upper end of the upright 54 and is of a shape and size to frictionally engage the under-side of the top of the trunk so as to hold the upper end portion of the part 54 in place.

From each of the lower bars 52 depends a bar 61 which inclines toward and is secured to the lower portion of the door and lies against the front of a bin 62 so as to hold the bin against looseness when the trunk is closed. This bin rests within the bottom portion of the drawer frame. When the door of the trunk is opened, the bin is carried forward with the drawer frame until it strikes the threshold formed by the angle bar 5 where access may be had to the front compartment by means of the door 63. To have access to the rear compartment of the bin, the bin is tilted forwardly upon the bar 5 as a fulcrum and then the lid 64 may be opened. If desired the bin can be entirely removed from the trunk.

What is claimed is:

1. A wardrobe trunk comprising a main trunk section having an open front and a base extension projecting beyond the open front, a door member closing the open front of the main trunk section above the base extension thereof, a single means housed within the door for locking the door to the base extension and one side of the main trunk section, and a lock for said locking means.

2. A wardrobe trunk having an open front, a door for said open front, a set of drawers mounted as a unit within the main trunk section for movement in a line perpendicular to the back of the trunk, and means actuated by the door for moving said unit to the front of the trunk by the opening of the door and for moving said unit into the back of the trunk by the closing of the door.

3. A wardrobe trunk comprising a main trunk section having an open front, a door for said open front, a set of drawers mounted as a unit within the trunk, links pivotally hung from the top of the trunk and supporting the drawers, and means actuated by the movement of the door for swinging the links to move the drawers into and out of the trunk.

4. A wardrobe trunk comprising a main trunk section having an open front, a door for the open front of the trunk section, a frame within the trunk and carrying a plurality of drawers, links pivotally hung from the top of the trunk and pivotally connected to the frame, levers fulcrumed within the trunk and loosely associated with the frame, and a connection between the door and the levers for swinging the latter and moving the frame to the front and to the back of the trunk section.

5. A wardrobe trunk comprising a main trunk section having an open front, a door for the open front, a frame mounted to move forwardly and rearwardly within the main trunk section, drawers mounted in the frame, upper and lower substantially U-shaped yokes having their ends fulcrumed within the main trunk section and their cross-head portions extending rearwardly across the frame, the side members of each yoke being loosely connected to the frame, and a link connection between the door and each of the yokes for moving the frame into and out of the main trunk section.

6. A wardrobe trunk comprising a main trunk section having an open front, a door for said open front, a series of drawers mounted within the main trunk section for front and back movement therein, means actuated by the door for moving the drawers as a unit, and a clothes-press carried by the inner side of the door and operating to hold the drawers as a unit within the main trunk section when the door is closed.

7. A wardrobe trunk comprising a main trunk section having an open front, a door to close the open front, a series of drawers within the upper portion of the main trunk section, a compartment bin within the main trunk section and below the drawers and capable of being removed through the open front, the door having means thereon engaging the bin in the closed position of the door to clamp the bin against the back of the main trunk section.

8. A wardrobe trunk comprising a main trunk section having an open front, a door for said open front, a series of drawers within the upper portion of the main trunk section and mounted to move as a unit into and out the trunk, means actuated by the door for moving the drawers as a unit, a clothespress carried by the door and operating to clamp the drawers against the back of the trunk in the closed position of the door, a removable bin within the main trunk section and below the drawers, and means carried by the door and engaging the bin to hold the latter against the back of the main trunk section in the closed position of the door.

EDWARD A. HOFF.
WILLIAM C. SANFORD.

CERTIFICATE OF CORRECTION.

Patent No. 1,666,011.  Granted April 10, 1928, to

EDWARD A. HOFF ET AL.

It is hereby certified that error appears in the printed specification of the above numbered patent requiring correction as follows: Page 1, line 25, for the word "he" read "be"; page 2, line 66, between the words "at and its" insert "31 at"; and that the said Letters Patent should be read with these corrections therein that the same may conform to the record of the case in the Patent Office.

Signed and sealed this 1st day of May, A. D. 1928.

(Seal)

M. J. Moore,
Acting Commissioner of Patents.